(12) United States Patent
Kramer et al.

(10) Patent No.: US 6,419,037 B1
(45) Date of Patent: Jul. 16, 2002

(54) MULTI-UNIT ARTICULATED ROAD TRAIN PROPULSION SYSTEM

(75) Inventors: Dennis A. Kramer, Troy; Dale Bell, Ortonville; Ronald N. Brissette, Lake Orion; Christopher S. Keeney, Troy, all of MI (US); Jack R. McKenzie, Hendersonville, NC (US); Brian J. Mueller, Lake Orion, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/619,145

(22) Filed: Jul. 19, 2000

(51) Int. Cl.[7] ............................................... B62D 59/04
(52) U.S. Cl. ..................................................... 180/14.2
(58) Field of Search ............................... 180/14.1, 14.2, 180/14.6, 14.3

(56) References Cited

U.S. PATENT DOCUMENTS

| | | |
|---|---|---|
| 2,630,871 A | 3/1953 | Simpkins |
| 3,209,850 A | 10/1965 | Fish |
| 3,578,096 A * | 5/1971 | Pearson |
| 3,780,819 A | 12/1973 | Coordes |
| 3,888,142 A * | 6/1975 | Ziegele |
| 4,082,157 A * | 4/1978 | Sternberg |
| 4,231,442 A * | 11/1980 | Birkeholm |
| 4,502,557 A * | 3/1985 | Anderson |
| 4,505,347 A | 3/1985 | Prechtel |
| 4,518,053 A * | 5/1985 | Queveau |
| 4,610,325 A * | 9/1986 | Anderson |
| 4,762,192 A | 8/1988 | Maxwell |
| 4,771,838 A * | 9/1988 | Ketcham |
| 5,147,003 A | 9/1992 | De Monclin |
| 5,330,020 A | 7/1994 | Ketcham |
| 5,332,052 A | 7/1994 | Carnevale |

* cited by examiner

*Primary Examiner*—Kevin Hurley
(74) *Attorney, Agent, or Firm*—Carlson, Gaskey & Olds

(57) ABSTRACT

A distributed propulsion system is provided for a multi-unit articulated road train. The distributed propulsion system includes a tractor having a first propulsion system for propelling the tractor. A trailer is secured to the tractor at an articulated joint, such as a fifth wheel or draw bar connection. The tractor has a second propulsion system for substantially propelling the trailer. A load sensor for detecting a load between the tractor and the trailer, preferably the tensile load, is associated with the articulated joint. The load sensor produces a load signal. An input device produces a request signal for actuating the second propulsion system. An electronic control mechanism is electrically connected to the input device and the load sensor for coordinating the various sensors and inputs. The control mechanism commands the second propulsion system in response to the load signal and the request signal such that the trailer is propelled in a controlled manner relative to the tractor.

13 Claims, 3 Drawing Sheets

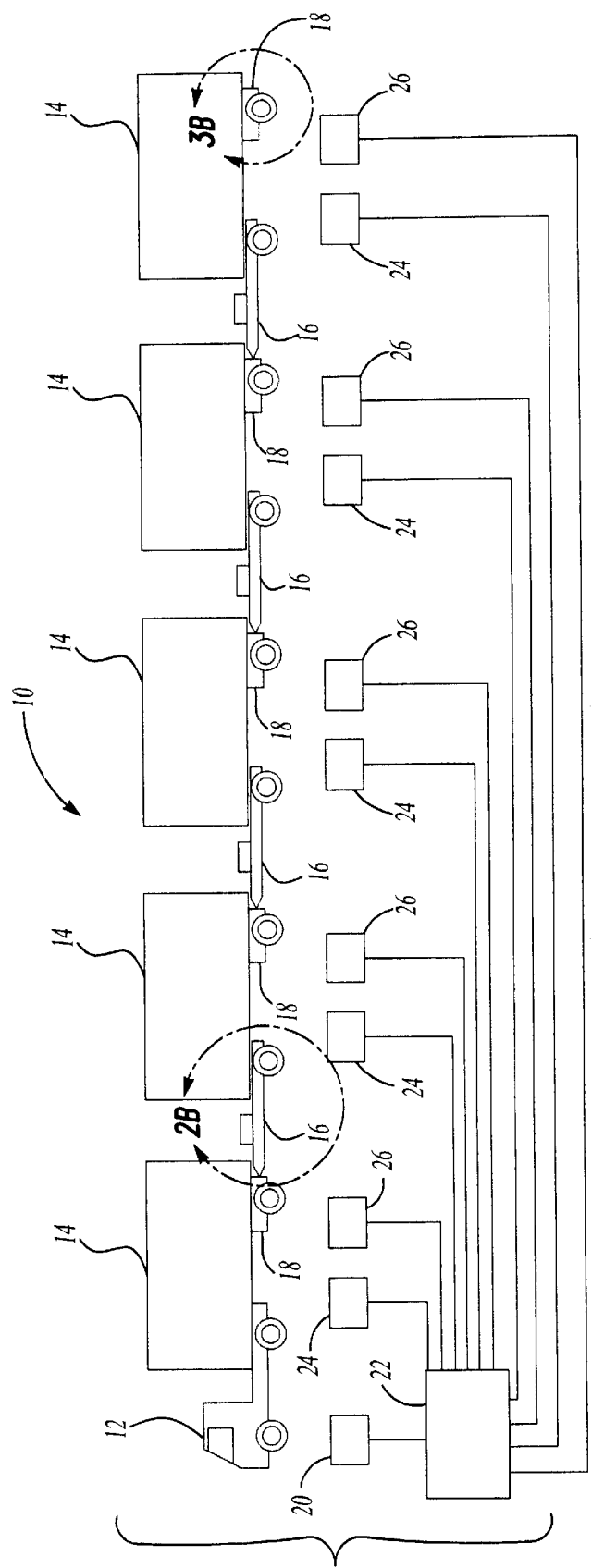

MULTI-UNIT ARTICULATED ROAD TRAIN PROPULSION SYSTEM

BACKGROUND OF THE INVENTION

This invention relates to a distributed propulsion system for a multi-unit articulated road train, and more specifically, the invention relates to a system for controlling and coordinating multiple propulsion systems.

Many commercial vehicles for use on highways employ a tractor that pulls a trailer that holds cargo. Typically, the tractor has a propulsion system that includes an internal combustion engine, usually diesel, and a transmission and drive axle. The trailer and its cargo are simply pulled by the drive force generated by the tractor's propulsion system. Accordingly, the tractor must be able to generate enough drive force to propel both the tractor and the trailer. Often several trailers are pulled by the tractor to increase the cargo that the tractor is able to deliver to a destination. As a result, the tractor must be capable of pulling the combined load of each trailer and its associated cargo. However, the same tractor at other times may only pull one trailer, or none at all, which results in enormous inefficiencies because the tractor's propulsion system may be grossly overpowered for the given task.

Trailers having separate propulsion systems have been used so that a tractor or other lead vehicle is not required to generate a drive force to pull the trailer. It is necessary to coordinate the propulsion systems of the tractor and trailer so that the vehicle may operate safely. This is especially important for multi-unit road trains having two or more trailers because of the increasing vehicle instability and possibility of jack-knifing as trailers are added to the train. Load sensors have been incorporated between the units to actuate the propulsion system of the trailer when a tensile load is detected. However, this type of propulsion system is unable to coordinate multiple units with one another and each unit acts independently from the other. Furthermore, the response of each trailer lags since a tensile load is required between each unit before the unit will begin to propel itself. As a result, for a road train, the last unit will not begin to move, until every single unit in front of it has begun to move, one at a time. Therefore, what is needed is a distributed propulsion system that is capable of coordinating each unit and achieving a faster response time for improved control.

SUMMARY OF THE INVENTION AND ADVANTAGES

The present invention provides a distributed propulsion system for a multi-unit articulated road train. The distributed propulsion system includes a tractor having a first propulsion system for propelling the tractor. A trailer is secured to the tractor at an articulated joint, such as a fifth wheel or draw bar connection. The tractor has a second propulsion system for substantially propelling the trailer. A load sensor for detecting a load between the tractor and the trailer, preferably the tensile load, is associated with the articulated joint. The load sensor produces a load signal. An input device produces a request signal for actuating the second propulsion system. An electronic control mechanism is electrically connected to the input device and the load sensor for coordinating the various sensors and inputs. The control mechanism commands the second propulsion system in response to the load signal and the request signal such that the trailer is propelled in a controlled manner relative to the tractor.

Accordingly, the above invention provides a distributed propulsion system that is capable of coordinating each unit and achieving a faster response time for improved control.

BRIEF DESCRIPTION OF THE DRAWINGS

Other advantages of the present invention can be understood by reference to the following detailed description when considered in connection with the accompanying drawings wherein:

FIG. 1 is a schematic view of a multi-unit articulated road train and the distributed propulsion system of the present invention shown beneath the road train;

DETAILED DESCRIPTION OF THE PREFERRED EMBODIMENT

Figure 2A:
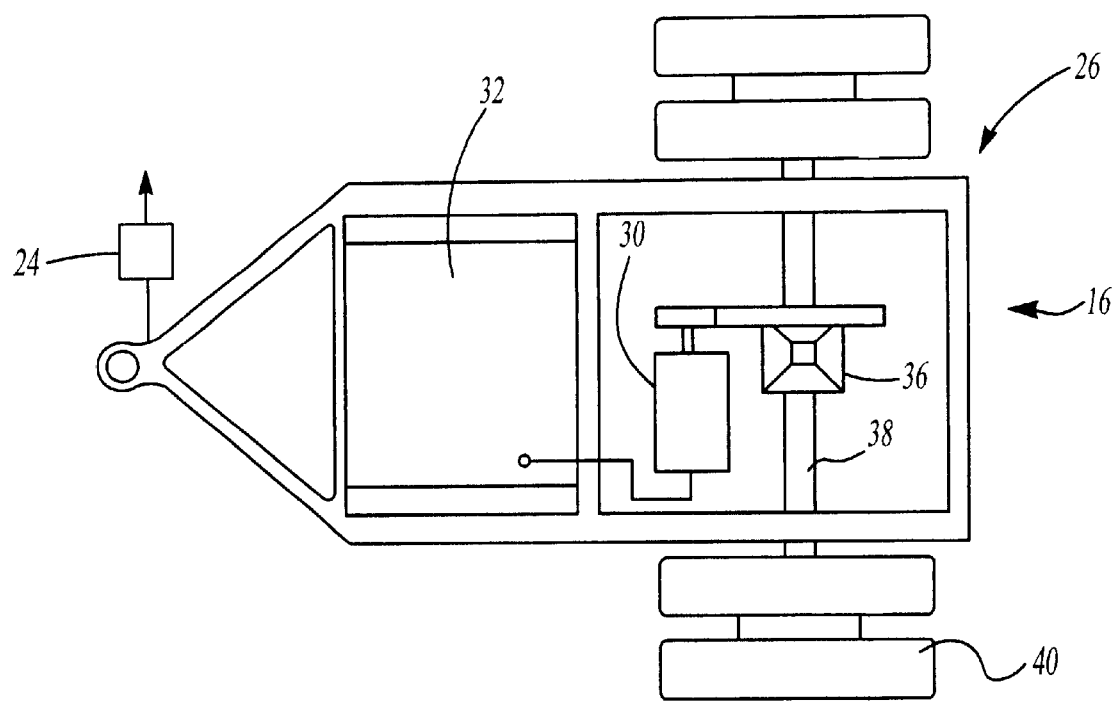
FIG. 2A is a top elevational view of a removable dolly of the present invention.

A multi-unit articulated road train 10 is shown in the upper half of FIG. 1. The road train 10 has a tractor 12 and a plurality of trailers 14 connected to one another and pulled by the tractor 12. The tractor 12 has a first propulsion system (not shown) for propelling the tractor 12. The trailers 14 are each supported by a dolly 16 and a rear suspension module 18. The trailers 14 are secured to the tractor 12 and one another at an articulated joint such as a fifth wheel 28 (shown in FIG. 2B) or draw bar connection. The trailer 14 connected to the tractor 12 is not shown with a dolly, although one may be used, and may be supported by the rear of the tractor.

The trailer 14 has a second propulsion system 26 for substantially propelling the trailer 14. That is, the first propulsion system need not generate enough drive force to pull the trailer 14. The second propulsion system 26 may be an internal combustion engine, a hydrostatic drive, an electric motor, or any other type of drive system. Referring to the lower half of FIG. 1, the trailer propulsion systems 26 are controlled by an input device 20 and a control mechanism 22. The control mechanism 22 may be hardware, software, or a combination thereof. The control mechanism 22 may be a single control module, and preferably, the control mechanism 22 is centrally located on the tractor 12. The input device 20, which may be the accelerator pedal in the tractor 12, is connected to each of the second propulsion systems 26 through the control mechanism 22.

The input device 20 produces a request signal, which may be a desired rate of acceleration, that is received by the control mechanism 22 which in turn commands each of the second propulsion systems 26 to begin to propel its respective trailer 14. However, to increase stability of the road train 10, sensors 24 are used with each trailer 14 to modify the command sent by the control mechanism 22. One such sensor may be a load sensor for detecting a load between the tractor 12 and the trailer 14 (or between trailers). The load that the load sensor 24 preferably detects is the tensile load associated with the articulated joint. The load sensor 24 may be positioned at the fifth wheel or along the drawbar of the dolly 16 or in any other suitable location. Detecting and maintaining a tensile load between the units will prevent a unit from overrunning another unit and causing the road train 10 to jack-knife.

The load sensor 24 produces a load signal. The electronic control mechanism 22 is electrically connected to the input device 20 and the load sensor 24 for coordinating the various sensors and inputs. The control mechanism 22 commands the second propulsion systems 26 in response to the load signal from the load sensor 24 and the request signal from the input device 20 such that the trailer is propelled in a controlled manner relative to the tractor. To achieve this, the control mechanism 22 actuates each of the second propulsion systems 26, for example, by applying reducing power or commanding additional drive force to maintain the desired tensile load and rate of acceleration. The control mechanism 22 may also command that a brake force be applied by a brake system.

In addition to incorporating a load sensor, the present invention may also use a weight sensor. The weight sensor may be located on the trailer 14 for detecting the weight of the trailer and producing a weight signal. The weight sensor is electrically connected to the control mechanism 22 the control mechanism commanding the second propulsion system 26 in response to the weight signal. In this manner, the output of the second propulsion system 26 may be further adjusted base upon the loading conditions of the trailer 14.

Figure 2B:
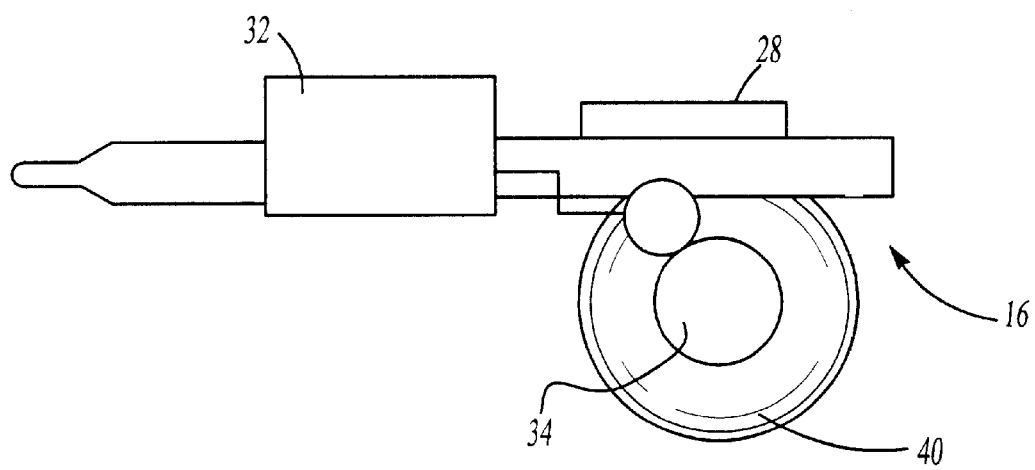
FIG. 2B is a side elevational view of the removable dolly shown in FIG. 2A.

Referring to FIGS. 2A and 2B, the propulsion system 26 may be located in a removable dolly 16. The dolly 16 includes framed structure with a fifth wheel 28 for supporting the trailer 14 and a drawbar for connecting to another unit of the road train. The load sensor 24 is associated with the framed structure for detecting a tensile load in the framed structure. The drive system 26 has a drive unit 30, such as an electric motor, and may also include gears 34, differential 36, and a drive axle 38 for driving drive wheels 40. The control mechanism 22, or a portion thereof, may be located on the dolly 16.

Figure 3A:
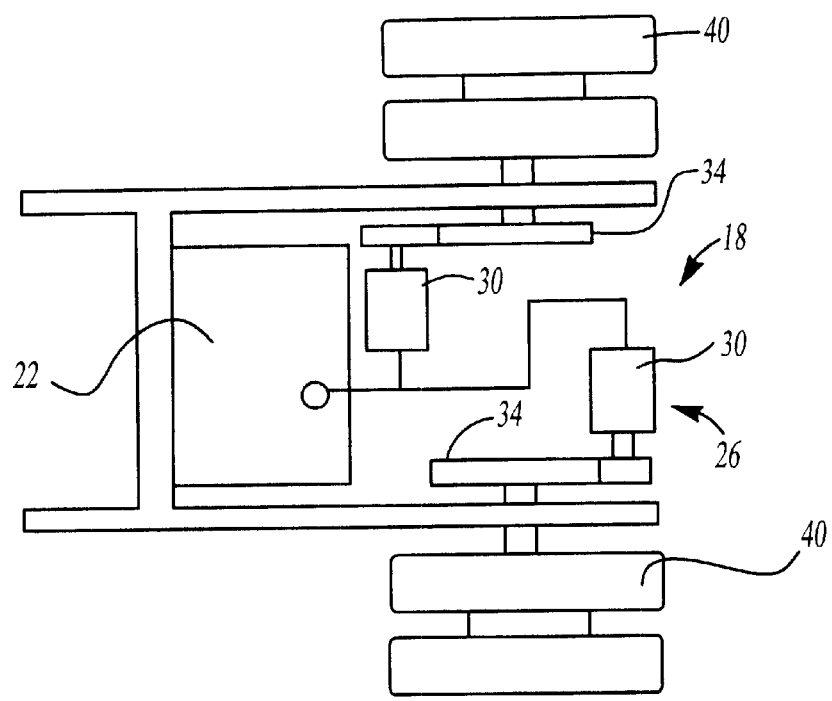
FIG. 3A is a top elevational view of a rear suspension module of the present invention.
Figure 3B:
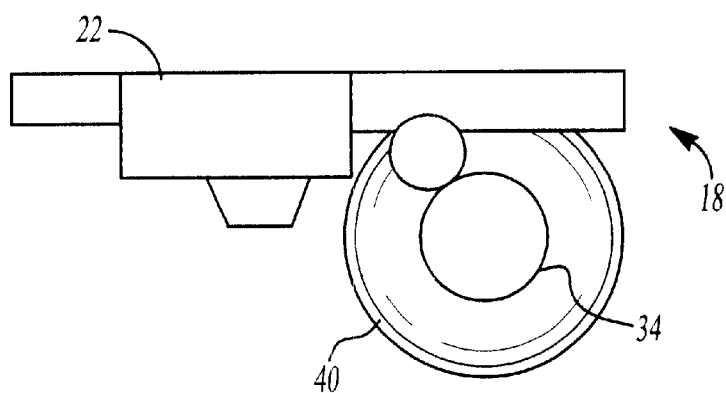
FIG. 3B is a side elevational view of the rear suspension module shown in FIG. 3A.

Alternatively, a powered suspension module 18 may be used instead of the powered dolly 16. Referring to FIGS. 3A and 3B, the rear of the trailer 14 is supported by the rear suspension module 18. Specifically, a framed structure supports the rear of the trailer 14, and the drive system 26 is supported by the framed structure. The control mechanism 22, or a portion thereof, may be located on the suspension module 18.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A distributed propulsion system for a multi-unit articulated road train, said system comprising:
    a tractor having a first propulsion system for propelling said tractor;
    a trailer secured to said tractor at an articulated joint, said trailer having a second propulsion system for substantially propelling said trailer, wherein said second propulsion system includes an internal combustion engine;
    a load sensor for detecting a load between said tractor and said trailer associated with said articulated joint and producing a load signal;
    an input device for producing a request signal for actuating said second propulsion system; and
    an electronic control mechanism electrically connected to said input device and said load sensor, said control mechanism commanding said second propulsion system in response to said load signal and said request signal.

2. A distributed propulsion system for a multi-unit articulated road train, said system comprising:
    a tractor having a first propulsion system for propelling said tractor;
    a trailer secured to said tractor at an articulated joint, said trailer having a second propulsion system for substantially propelling said trailer, wherein said second propulsion system includes an electric motor;
    a load sensor for detecting a load between said tractor and said trailer associated with said articulated joint and producing a load signal;
    an input device for producing a request signal for actuating said second propulsion system; and
    an electronic control mechanism electrically connected to said input device and said load sensor, said control mechanism commanding said second propulsion system in response to said load signal and said request signal.

3. A distributed propulsion system for a multi-unit articulated road train, said system comprising:
    a tractor having a first propulsion system for propelling said tractor;
    a trailer secured to said tractor at an articulated joint, said trailer having a second propulsion system for substantially propelling said trailer wherein said trailer further includes a removable dolly with said second propulsion system supported in said removable dolly;
    a load sensor for detecting a load between said tractor and said trailer associated with said articulated joint and producing a load signal;
    an input device for producing a request signal for actuating said second propulsion system; and
    an electronic control mechanism electrically connected to said input device and said load sensor, said control mechanism commanding said second propulsion system in response to said load signal and said request signal.

4. A distributed propulsion system for a multi-unit articulated road train, said system comprising:
    a tractor having a first propulsion system for propelling said tractor;
    a trailer secured to said tractor at an articulated joint, said trailer having a second propulsion system for substantially propelling said trailer wherein said trailer includes a drawbar;
    a load sensor for detecting a load between said tractor and said trailer associated with said articulated joint and producing a load signal and said load sensor is positioned along said drawbar;
    an input device for producing a request signal for actuating said second propulsion system; and
    an electronic control mechanism electrically connected to said input device and said load sensor, said control mechanism commanding said second propulsion system in response to said load signal and said request signal.

5. A distributed propulsion system for a multi-unit articulated road train, said system comprising:
    a tractor having a first propulsion system for propelling said tractor;
    a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system wherein said input device is an accelerator pedal; and an electronic control mechanism electrically connected to said input device and said load sensor, said control mechanism commanding said second propulsion system in response to said load signal and said request signal.

6. A distributed propulsion system for a multi-unit articulated road train, said system comprising:

a tractor having a first propulsion system for propelling said tractor;

a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system; and an electronic control mechanism electrically connected to said input device and said load sensor, said control mechanism commanding said second propulsion system in response to said load signal and said request signal wherein said control mechanism is a single control module located on said tractor.

7. A distributed propulsion system for a multi-unit articulated road train, said system comprising:

a tractor having a first propulsion system for propelling said tractor;

a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system; and an electronic control mechanism electrically connected to said input device and said load sensor, said control mechanism commanding said second propulsion system in response to said load signal and said request signal, wherein said control mechanism is software.

8. A distributed propulsion system for a multi-unit articulated road train, said system comprising:

a tractor having a first propulsion system for propelling said tractor;

a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system;

an electronic control mechanism electrically connected to said input device and said load sensor, said control mechanism commanding said second propulsion system in response to said load signal and said request signal; and a weight sensor located on said trailer for detecting the weight of said trailer and producing a weight signal, said weight sensor electrically connected to said control mechanism with said control mechanism commanding said second propulsion system in response to said weight signal.

9. A distributed propulsion system for a multi-unit articulated road train, said system comprising:

a tractor having a first propulsion system for propelling said tractor;

a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system;

an electronic control mechanism electrically connected to said input device and said load sensor, said control mechanism commanding said second propulsion system in response to said load signal and said request signal; and a second trailer having a third propulsion system for substantially propelling said second trailer, said second trailer secured to said trailer at a second articulated joint with a second load sensor for detecting a second load between said trailer and said second trailer associated with said second articulated joint and producing a second load signal, said request signal actuating said third propulsion system, said second load sensor electrically connected to said control mechanism, and said control mechanism further actuating said third propulsion system in response to said second load signal and said request signal.

10. The distributed system according to claim 9, further comprising a third trailer having a fourth propulsion system for substantially propelling said third trailer, said third trailer secured to said second trailer at a third articulated joint with a second load sensor for detecting a third load between said second trailer and said third trailer associated with said third articulated joint and producing a third load signal, said request signal actuating said fourth propulsion system, said third load sensor electrically connected to said control mechanism, and said control mechanism further actuating said fourth propulsion system in response to said third load signal and said request signal.

11. A propulsion system for use with a trailer in a multi-unit articulated road train, said propulsion system comprising:

a framed structure with a fifth wheel for supporting the trailer and a drawbar for connecting to another unit of the road train;

a load sensor associated with said framed structure for detecting a tensile load in said framed structure;

a drive system having a drive unit driving a drive wheel; and an electronic control mechanism having an input for receiving signals from an input device and said load sensor, said control mechanism commanding said drive system in response to said signals.

12. The propulsion system according to claim 11, wherein said drive system, said load sensor, and said electronic control system are supported on said framed structure.

13. A distributed propulsion system for a multi-unit articulated road train, said system comprising:

a tractor having a first propulsion system for propelling said tractor;

a trailer secured to said tractor at an articulated joint, said trailer having a second propulsion system for substantially propelling said trailer;

a load sensor for detecting a load between said tractor and said trailer associated with said articulated joint and producing a load signal;

an input device for producing a request signal for actuating said second propulsion system wherein said input device provides a desired rate of acceleration for the road train; and an electronic control mechanism electrically connected to said input device and said load sensor, said control mechanism commanding said second propulsion system in response to said load signal and said request signal.

* * * * *